US010521770B2

(12) United States Patent
Arora et al.

(10) Patent No.: US 10,521,770 B2
(45) Date of Patent: Dec. 31, 2019

(54) DYNAMIC PROBLEM STATEMENT WITH CONFLICT RESOLUTION

(71) Applicant: International Business Machines Corporation, Armonk, NY (US)

(72) Inventors: Pritpal S. Arora, Bangalore (IN); Ramachandra S. Byahatti, Bangalore (IN); Bhupesh Gupta, Bangalore (IN); Bijo S. Kappen, Bangalore (IN); Gopal S. Pingali, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 1061 days.

(21) Appl. No.: 14/851,566

(22) Filed: Sep. 11, 2015

(65) Prior Publication Data
US 2017/0076205 A1    Mar. 16, 2017

(51) Int. Cl.
*G06Q 10/10* (2012.01)
*G06Q 50/00* (2012.01)

(52) U.S. Cl.
CPC .......... *G06Q 10/103* (2013.01); *G06Q 10/10* (2013.01); *G06Q 50/01* (2013.01)

(58) Field of Classification Search
CPC ........ G06F 17/30525; G06F 17/30598; G06Q 10/00; H04L 41/5074
See application file for complete search history.

(56) References Cited

U.S. PATENT DOCUMENTS

| 5,386,515 A | 1/1995 | Martin et al. |
| 6,611,822 B1 * | 8/2003 | Beams ................... G06Q 10/10 706/11 |
| 6,735,597 B1 | 5/2004 | Parodies |

(Continued)

FOREIGN PATENT DOCUMENTS

| EP | 2498209 A1 | 2/2012 |
| WO | 2009076203 A1 | 6/2009 |

(Continued)

OTHER PUBLICATIONS

Mell et al., "The NIST Definition of Cloud Computing", NIST National Institute of Standards and Technology, US Department of Commerce, Special Publication 800-145, Sep. 2011, 7 pages.

(Continued)

Primary Examiner — Taelor Kim
(74) Attorney, Agent, or Firm — Edward J. Wixted, III (57) ABSTRACT

In an approach for providing a dynamic definition of a problem statement during an IT critical situation with an associated conflict resolution, a processor receives an initial problem definition. A processor identifies related social collaboration channels associated with the initial problem definition. A processor updates users within the related social collaboration channels. A processor determines there is at least one problem update from the related social collaboration channels. A processor identifies a set of subject matter experts who are relevant to the initial problem definition. A processor initiates a different social collaboration channel for the set of subject matter experts. A processor determines a consensus to a solution to the initial problem definition is gained by the set of subject matter experts. A processor updates the initial problem definition to include the solution.

20 Claims, 5 Drawing Sheets

(56) References Cited

U.S. PATENT DOCUMENTS

| | | | |
|---|---|---|---|
| 7,007,235 B1* | 2/2006 | Hussein | G06Q 10/10 715/751 |
| 7,200,592 B2 | 4/2007 | Goodwin et al. | |
| 7,298,867 B2 | 11/2007 | Slaski | |
| 7,543,047 B2 | 6/2009 | Park et al. | |
| 7,707,249 B2 | 4/2010 | Spataro et al. | |
| 7,716,739 B1 | 5/2010 | McCorkendale | |
| 7,917,815 B2 | 3/2011 | Rapp et al. | |
| 7,937,281 B2* | 5/2011 | Miller | G06Q 10/06 705/7.12 |
| 8,200,527 B1 | 6/2012 | Thompson et al. | |
| 8,266,072 B2 | 9/2012 | Grace et al. | |
| 8,281,248 B2 | 10/2012 | Kürpick et al. | |
| 8,346,006 B1 | 1/2013 | Darbari et al. | |
| 8,352,870 B2 | 1/2013 | Bailor et al. | |
| 8,365,019 B2 | 1/2013 | Sailer et al. | |
| 8,473,432 B2 | 6/2013 | Anerousis et al. | |
| 8,572,022 B2 | 10/2013 | Hagan et al. | |
| 8,589,778 B2 | 11/2013 | Boyle et al. | |
| 8,635,283 B2 | 1/2014 | Vellanki et al. | |
| 8,639,650 B1* | 1/2014 | Gill | G06N 5/04 706/61 |
| 8,805,977 B2 | 8/2014 | Vemulapalli et al. | |
| 8,929,528 B2 | 1/2015 | Wallace et al. | |
| 9,425,966 B1 | 8/2016 | Potlapally et al. | |
| 2002/0194047 A1 | 12/2002 | Edinger et al. | |
| 2003/0028525 A1 | 2/2003 | Santos et al. | |
| 2003/0046308 A1 | 3/2003 | Weber et al. | |
| 2004/0243422 A1 | 12/2004 | Weber et al. | |
| 2005/0086248 A1 | 4/2005 | Atchison | |
| 2005/0289168 A1 | 12/2005 | Green et al. | |
| 2006/0211404 A1 | 9/2006 | Cromp et al. | |
| 2008/0022209 A1 | 1/2008 | Lyle | |
| 2008/0114783 A1 | 5/2008 | Nguyen et al. | |
| 2008/0244418 A1* | 10/2008 | Manolescu | G06Q 10/00 715/753 |
| 2008/0281915 A1* | 11/2008 | Elad | G06Q 10/10 709/204 |
| 2008/0288914 A1* | 11/2008 | Schmitter | G06Q 10/06 717/101 |
| 2009/0006161 A1 | 1/2009 | Chen et al. | |
| 2009/0063387 A1 | 3/2009 | Beaty et al. | |
| 2009/0083221 A1 | 3/2009 | Pingali et al. | |
| 2010/0050093 A1 | 2/2010 | Behrens et al. | |
| 2010/0057522 A1 | 3/2010 | Borowski et al. | |
| 2010/0070883 A1 | 3/2010 | Hamilton, II et al. | |
| 2010/0162131 A1 | 6/2010 | Gaillard et al. | |
| 2010/0262610 A1 | 10/2010 | Acosta et al. | |
| 2010/0318846 A1 | 12/2010 | Sailer et al. | |
| 2010/0325206 A1 | 12/2010 | Dayal et al. | |
| 2011/0055699 A1* | 3/2011 | Li | G06F 17/30864 715/709 |
| 2011/0208822 A1 | 8/2011 | Rathod | |
| 2012/0226803 A1 | 9/2012 | Bharadwaj | |
| 2013/0132318 A1 | 5/2013 | Tanimoto et al. | |
| 2013/0151624 A1 | 6/2013 | Bhogal et al. | |
| 2013/0151948 A1 | 6/2013 | Khalil et al. | |
| 2013/0166550 A1 | 6/2013 | Buchmann et al. | |
| 2013/0197951 A1* | 8/2013 | Watson | G06Q 10/06 705/7.12 |
| 2013/0198290 A1 | 8/2013 | Thomas | |
| 2013/0218783 A1 | 8/2013 | Anand | |
| 2014/0149436 A1 | 5/2014 | Bahrami et al. | |
| 2014/0164525 A1 | 6/2014 | Malik et al. | |
| 2014/0247460 A1 | 9/2014 | Gaertner et al. | |
| 2014/0279625 A1 | 9/2014 | Carter | |
| 2015/0032492 A1 | 1/2015 | Ting et al. | |
| 2015/0046643 A1 | 2/2015 | Whelan | |
| 2015/0179186 A1 | 6/2015 | Swierk et al. | |
| 2016/0055455 A1 | 2/2016 | Hill et al. | |
| 2016/0055553 A1 | 2/2016 | Hill et al. | |
| 2016/0072750 A1 | 3/2016 | Kass et al. | |
| 2016/0078012 A1 | 3/2016 | Dauw et al. | |

FOREIGN PATENT DOCUMENTS

| | | |
|---|---|---|
| WO | 2013016514 A1 | 1/2013 |
| WO | 2013026095 A1 | 2/2013 |

OTHER PUBLICATIONS

List of IBM Patents or Patent Applications Treated As Related, Dated Apr. 21, 2016, 2 pages.

U.S. Appl. No. 14/948,670, filed Nov. 23, 2015, Entitled "Dynamic Problem Channel Constructor".

U.S. Appl. No. 14/948,766, filed Nov. 23, 2015, Entitled "Real-Time Tagger".

U.S. Appl. No. 15/091,882, filed Apr. 6, 2016, Entitled "Automatic Profile Generator and Scorer".

U.S. Appl. No. 15/092,036, filed Apr. 6, 2016, Entitled "Critical Situation Contribution and Effectiveness Tracker".

* cited by examiner

DYNAMIC PROBLEM STATEMENT WITH CONFLICT RESOLUTION

BACKGROUND OF THE INVENTION

The present invention relates generally to the field of incident management, and more particularly to a dynamic definition of a problem statement during an information technology (IT) critical situation with an associated conflict resolution.

Incident management is a term describing the activities of an organization to identify, analyze, and correct hazards to prevent a future reoccurrence. An incident is an event that could lead to loss of, or disruption to, an organization's operations, services, or functions. If not managed, an incident can escalate into an emergency, a crisis, or a disaster. Incident management is, therefore, the process of limiting the potential disruption caused by such an event, followed by a return to business as usual. Without effective incident management, an incident can rapidly disrupt business operations, information security, IT systems, employees or customers, and other vital business functions.

SUMMARY

Aspects of an embodiment of the present invention disclose a method, computer program product, and computing system for providing a dynamic definition of a problem statement during an IT critical situation with an associated conflict resolution. A processor receives an initial problem definition. A processor identifies related social collaboration channels associated with the initial problem definition. A processor updates users within the related social collaboration channels. A processor determines there is at least one problem update from the related social collaboration channels. A processor identifies a set of subject matter experts who are relevant to the initial problem definition. A processor initiates a different social collaboration channel for the set of subject matter experts. A processor determines a consensus to a solution to the initial problem definition is gained by the set of subject matter experts. A processor updates the initial problem definition to include the solution.

DETAILED DESCRIPTION

During an information technology (IT) incident or a critical situation involving any breakdown of an IT component involving a large scale outage, one of the preliminary steps to be performed is the problem definition (i.e., to define the problem and its associated sub-problems that need to be resolved in order to restore the IT incident or normalcy of operations).

Currently, an incident or critical situation is handled by entering the problem definition into a tool, such as an incident management tool, by an individual or a small group of individuals. Embodiments of the present invention recognize that this leads to limitations and a rigid problem definition that cannot be changed dynamically. Current tools do not enable a wide variety of subject matter experts (SMEs), across multiple technologies, distributed in different locations, and working on the problem on different communication channels around the globe, to dynamically define and refine the problem statement in order to come to an agreed upon problem statement.

Furthermore, embodiments of the present invention recognize that the problem statement cannot be reduced to its sub-problems, which may need to be addressed individually in relation to the original problem statement. Embodiments of the present invention also recognize that the current tools do not support any resolutions of conflicting problem statements across multiple sources/SMEs. Additionally, embodiments of the present invention recognize the need for a dynamic resolution of conflicting problem definitions coming from multiple people and communication/collaboration channels.

Due to the current state of incident management, embodiments of the present invention recognize the need to provide a dynamic definition of a problem statement during an IT critical situation with an associated conflict resolution.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
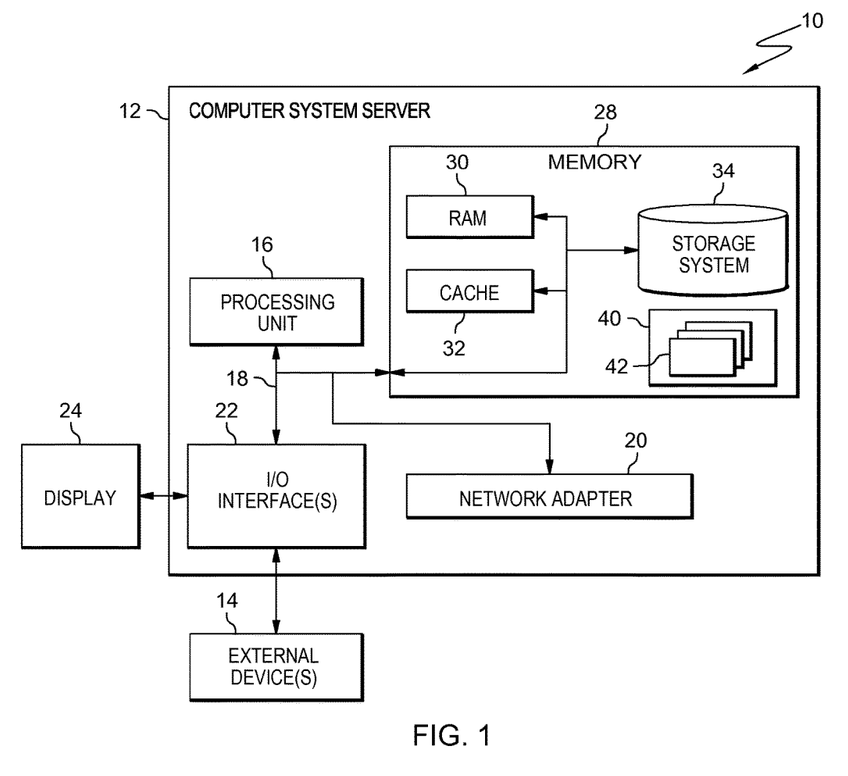
FIG. 1 depicts a block diagram according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
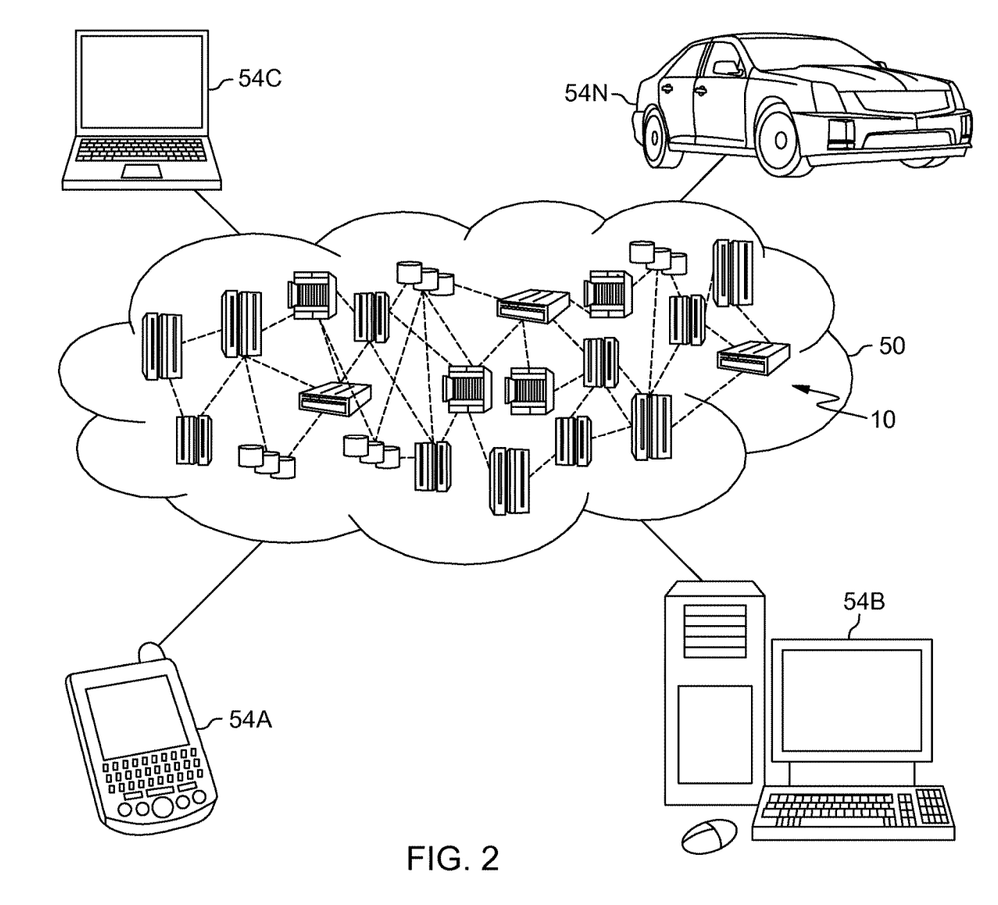
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
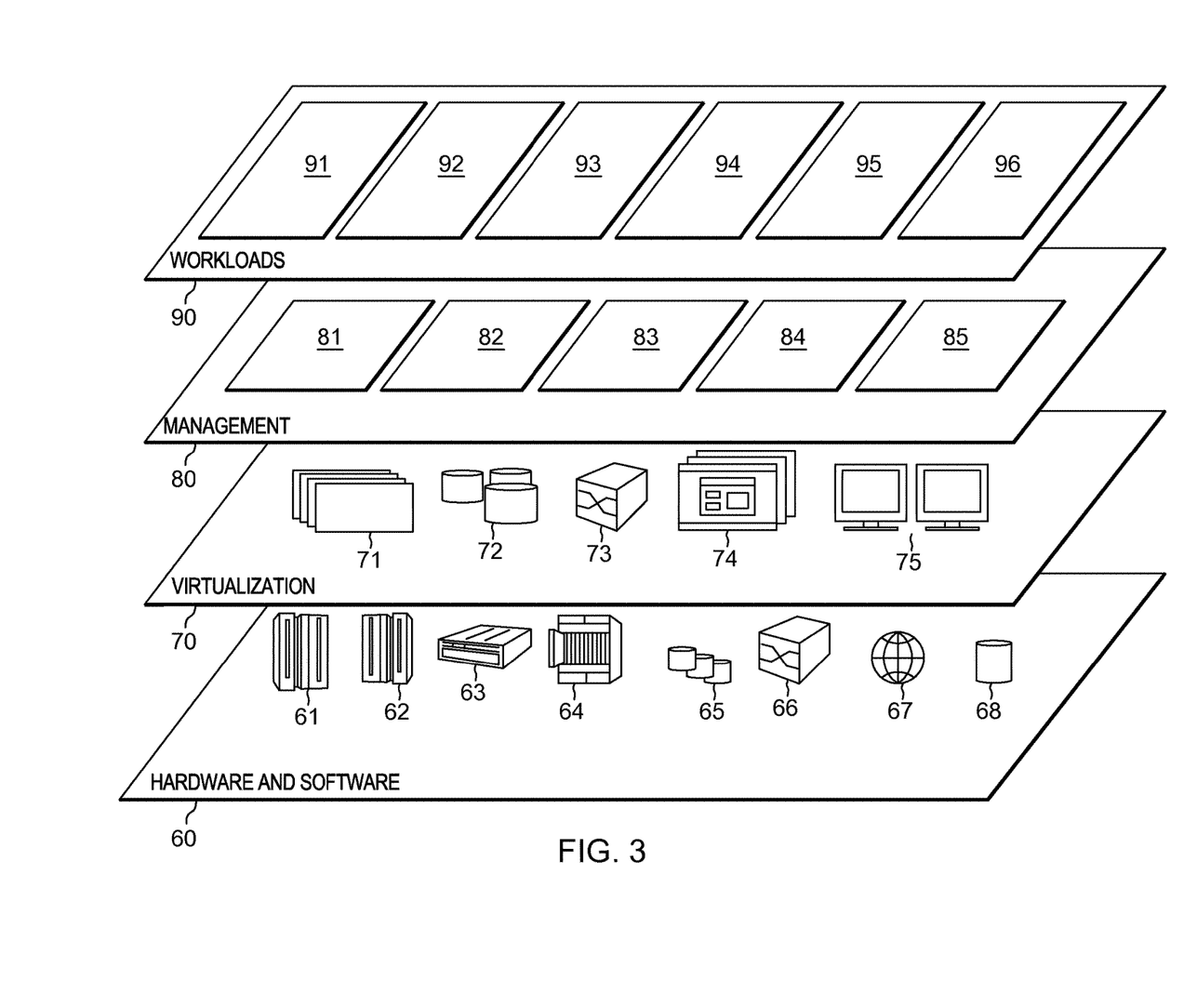
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and problem definer program 96.

Figure 4:
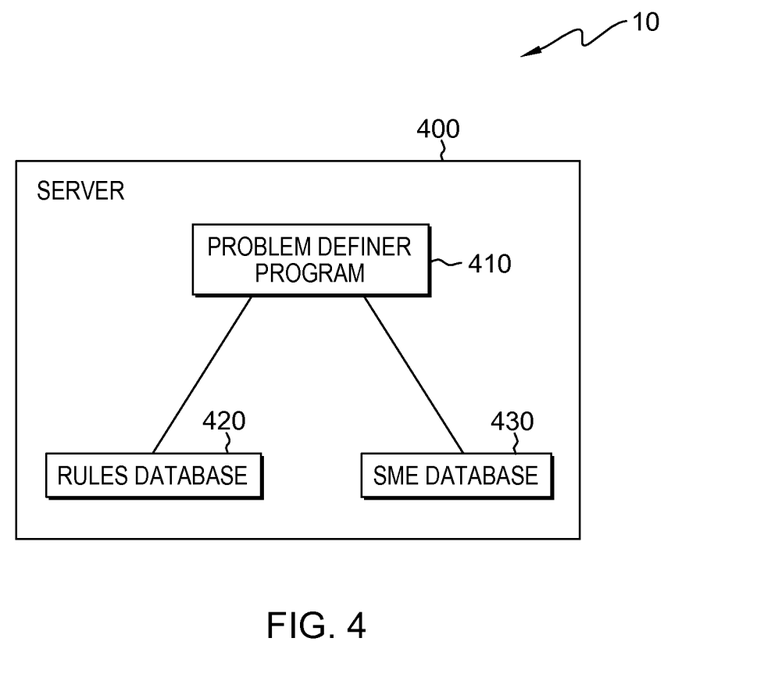
FIG. 4 depicts a block diagram of a computing system according to an embodiment of the present invention.

Referring now to FIG. 4, a diagram of a server 400 in cloud computing node 10 is shown, in accordance with one embodiment of the present invention. FIG. 4 provides an illustration of one embodiment and does not imply any limitations with regard to the environments in which different embodiments can be implemented.

In the depicted embodiment, server 400 contains problem definer 410, rules database 420, and SME database 430. Server 400 can include components as depicted and described in further detail with respect to FIG. 1.

Working within workloads layer 90 in FIG. 3, problem definer program 410 operates to provide a dynamic definition of a problem statement during an IT critical situation with an associated conflict resolution. In doing so, problem definer program 410 receives an initial problem definition. Problem definer program 410 identifies related social collaboration channels. Problem definer program 410 updates related social collaboration channels. Problem definer program 410 determines whether there are any new problem updates. Problem definer program 410 determines whether there are multiple updates. Problem definer program 410 determines whether rules exist for resolution. Problem definer program 410 identifies related SMEs. Problem definer program 410 initiates a social collaboration channel. Problem definer program 410 monitors the social collaboration channel. Problem definer program 410 determines whether a consensus is gained. Problem definer program 410 updates the problem definition. In the depicted embodiment, problem definer program 410 resides on server 400. In other embodiments, problem definer program 410, or similar programs, can reside on another server or another computing device, provided that problem definer program 410 has access to rules database 420 and SME database 430 over a network.

Rules database 420 can be a repository that can be written to or read by problem definer program 410. In one embodiment, a program (not shown) can allow a user to define various rules that can resolve various conflicts within a problem definition and store to rules database 420. In some embodiments, rules database 420 can store rules that are defined within another program. In other embodiments, rules database 420 can store rules that were previously analyzed and placed into a certain category of solutions. In the depicted embodiment, rules database 420 resides on server 400. In other embodiments, rules database 420, or similar databases, can reside on another server or another computing device, provided that rules database 420 is accessible to problem definer program 410 over a network.

SME database 430 can be a repository that can be written to or read by problem definer program 410. In one embodiment, a program (not shown) can allow a user to define various SMEs with their respective skills and availabilities and store the information to SME database 430. In the depicted embodiment, SME database 430 resides on server 400. In other embodiments, SME database 430, or similar databases, can reside on another server or another computing device, provided that SME database 430 is accessible to problem definer program 410 over a network.

Figure 5:
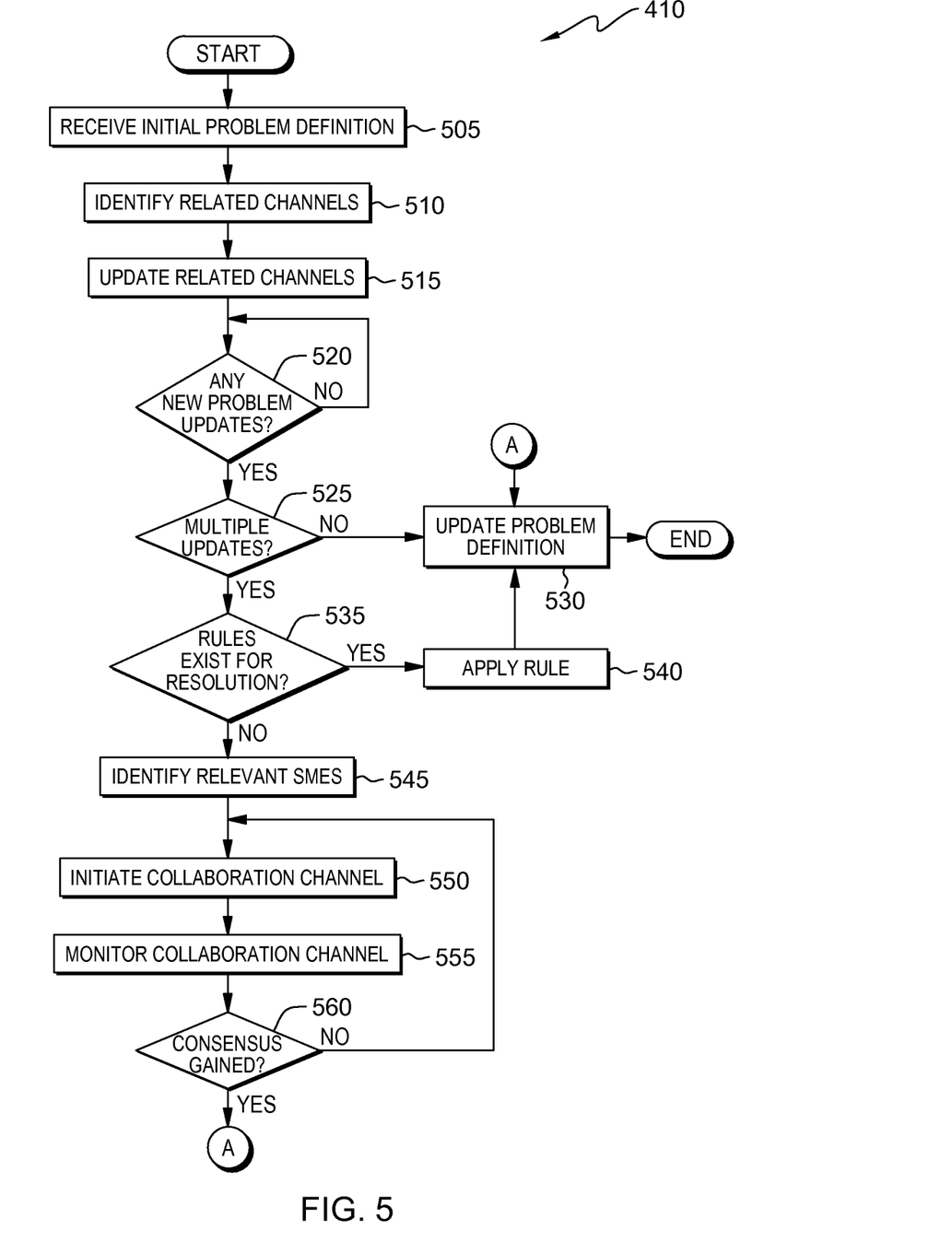
FIG. 5 depicts a flowchart of the steps of a problem definer program, executing within the computing system of FIG. 4, for providing a dynamic definition of a problem statement during an IT critical situation with an associated conflict resolution.

Referring now to FIG. 5, a flowchart of the steps of a problem definer program is shown, executing within the computing system of FIG. 4, in accordance with an embodiment of the present invention. Problem definer program 410 operates to provide a dynamic definition of a problem statement during an IT critical situation with an associated conflict resolution. The definition of a problem statement is used to determine what type of information needs to be gathered to find a resolution. The term "dynamic definition of a problem statement" refers to a definition of a problem statement that is characterized by constant change, activity, or progress. Cloud-based environments are constantly changing; therefore, the definition of a problem statement used has to be able to change as well.

In step 505, problem definer program 410 receives an initial problem definition. In one embodiment, problem definer program 410 receives an initial problem definition from a ticketing or incident management system. In other embodiments, problem definer program 410 receives an initial problem definition from a manual entry by an incident manager or critical situation manager. In one embodiment, the initial problem definition includes a statement of the problem. In other embodiments, the initial problem definition includes the service level or business impact of the problem. In some embodiments, the initial problem definition includes key actions and social collaboration channels being launched to resolve the problem. Still, in other embodiments, the initial problem definition includes a statement of the problem, the service level or business impact of the problem, and key actions and social collaboration channels being launched to resolve the problem.

In step 510, problem definer program 410 identifies social collaboration channels that are related to the problem. In one embodiment, the social collaboration channels include conference calling bridges. In other embodiments, the social collaboration channels include chat sessions. In some embodiments, the social collaboration channels include incident management systems.

In one embodiment, problem definer program 410 identifies related social collaboration channels based on a unique ID assigned to the overall incident or critical situation. In other embodiments, problem definer program 410 identifies related social collaboration channels based on a unique ID assigned to the problem or sub-problem statement. In some embodiments, problem definer program 410 identifies related social collaboration channels based on a unique ID assigned to the social collaboration channels associated with the problem or sub-problem.

In step 515, problem definer program 410 updates the users within the related social collaboration channels with the problem, so everyone affected by the problem will be aware. In one embodiment, problem definer program 410 updates the users within the related social collaboration channels with the problem definition using a problem definition participant or bot in a chat. In other embodiments, problem definer program 410 updates the users within the related social collaboration channels with the problem definition using an email agent. In some embodiments, problem definer program 410 updates the users within the related social collaboration channels with the problem definition using a virtual speaker in a conference bridge. Still, in other embodiments, problem definer program 410 updates the users within the related social collaboration channels with the problem definition using a dynamically updated webpage.

In decision 520, problem definer program 410 determines whether there are any new problem updates. Problem definer program 410 whether there are any new problem updates by communicating with the related social collaboration channels. During the communication, problem definer program 410 receives (1) an alert generated by the related social collaboration channel(s) that an update to the problem statement has been detected and (2) the updated problem statement. The problem statement can be updated or refined by any of the participants in any of the related social collaboration channels. If there are no new problem updates (decision 520, no branch), problem definer program 410 continues to seek new problem updates. In some embodiments, there is a predetermined time limit for problem definer program 410 to continue to seek new problem updates before problem definer program 410 ends. If there are new problem updates (decision 520, yes branch), problem definer program 410 determines whether there are multiple updates (decision 525).

In decision 525, problem definer program 410 determines whether there are multiple updates for the problem. In one embodiment, when seeking updates for the problem, problem definer program 410 receives alerts from the related social collaboration channels. Problem definer program 410 determines whether there are multiple updates for the problem by analyzing the alerts received from the related social collaboration channels to see if there is only one update or multiple updates coming simultaneously from multiple sources. If there are not multiple updates, meaning only one update, (decision 525, no branch), problem definer program 410 updates the problem definition received from a related social collaboration channel to include an associated conflict resolution (step 530). In one embodiment, problem definer program 410 goes back to step 510 and repeats the steps described above. In other embodiments, problem definer program 410 ends. If there are multiple updates (decision 525, yes branch), problem definer program 410 determines whether any rules exist for a resolution (decision 535).

In decision 535, problem definer program 410 determines whether any rules exist for a resolution. Problem definer program 410 determines whether any rules exist for a resolution by searching rules database 420 or a rule engine for any rules that can resolve the conflict in the problem definition. Examples of rules include, but are not limited to, (a) giving precedence to some social collaboration channels over other social collaboration channels; (b) giving precedence to certain subject matter experts (SMEs), depending on their level of expertise, level of responsibility, etc.; (c) giving precedence to certain locations (e.g., geographic locations); and (d) giving precedence to certain tags/keywords associated with the problem. If there are existing rules for a resolution (decision 535, yes branch), problem definer program 410 applies the rule (step 540) and updates the problem definition (step 530). In one embodiment, problem definer program 410 goes back to step 510 and repeats the steps described above. In other embodiments, problem definer program 410 ends. If there are no existing rules for a resolution (decision 535, no branch), problem definer program 410 identifies relevant SMEs (step 545).

In step 545, problem definer program 410 identifies relevant SMEs. In one embodiment, problem definer program 410 identifies a relevant set of skilled SMEs by matching the keywords associated with the problem definition to the skills and availability of SMEs in a database of conflict resolution SMEs, such as SME database 430. In other embodiments, problem definer program 410 identifies a relevant set of skilled SMEs based on the SMEs used in a previous social collaboration channel for a similar conflicting problem statement. In some embodiments, problem definer program 410 identifies a relevant set of skilled SMEs randomly.

In step 550, problem definer program 410 initiates a social collaboration channel. In one embodiment, problem definer program 410 initiates a social collaboration channel based on the preferred social collaboration channel for the majority of the SMEs. The SMEs are notified through this social collaboration channel of the conflicting problem statements. In other embodiments, problem definer program 410 initiates a social collaboration channel based on a previous social collaboration channel that was used for a similar conflicting problem statement. In some embodiments, problem definer program 410 initiates a social collaboration channel randomly.

In step 555, problem definer program 410 monitors the social collaboration channel for discussion on possible solutions to the problem. In one embodiment, problem definer program 410 monitors the social collaboration channel for a predetermined time period (e.g., one hour, one day, or one week). In other embodiments, problem definer program 410 monitors the social collaboration channel until problem definer program 410 receives an alert that the SMEs are finished collaborating.

In decision 560, problem definer program 410 determines whether a consensus is gained by the collaborating SMEs in how to solve the problem. In one embodiment, a consensus is majority (i.e., greater than 50%). In some embodiments, a consensus is unanimous (i.e., 100%). In other embodiments, a consensus can be any predetermined percentage given by an administrator.

In one embodiment, problem definer program 410 determines whether a consensus is gained based on the problem statement receiving the greatest number of votes. In such an embodiment, problem definer program 410 creates a poll, allowing the collaborating SMEs within the social collaboration channel to vote on ways to solve the problem. In other embodiments, problem definer program 410 determines whether a consensus is gained based on a refined problem statement agreed upon and updated by the SMEs. If there is no consensus by the SMEs (decision 560, no branch), problem definer program 410 initiates another social collaboration channel (step 550) to monitor (step 555) for a consensus. Another social collaboration channel is initiated for a different set of SMEs to determine a solution to the problem. If there is a consensus gained (decision 560, yes branch), problem definer program 410 updates the problem definition to include an associated conflict resolution (step 530). In one embodiment, problem definer program 410 goes back to step 510 and repeats the steps described above. In other embodiments, problem definer program 410 ends.

Furthermore, each problem or sub-problem can be further broken into new sub-problems at any stage by any authorized participant. In one embodiment, when a sub-problem is spawned, a separate social collaboration channel, with appropriate participants, is automatically initiated. Each sub-problem can, in turn, spawn new sub-problems, resulting in a "problem tree" corresponding to the incident or critical situation with one or more social collaboration channels associated with each "node" of the problem tree. The problem definition is dynamically updated for any of the nodes of the tree.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing a dynamic definition of a problem statement during an IT critical situation with an associated conflict resolution, the method comprising the steps of:

receiving, by one or more processors, an initial problem definition, wherein the initial problem definition includes a problem with an information technology (IT) component;

identifying, by one or more processors, related social collaboration channels associated with the initial problem definition, wherein the related social collaboration channels comprise electronic social collaboration channels;

notifying, by one or more processors, users within the related social collaboration channels of the initial problem definition;

determining, by one or more processors, that there is at least one problem update from the related social collaboration channels;

identifying, by one or more processors, a set of subject matter experts who are relevant to the at least one problem update;

responsive to determining that there is at least one problem update from the related social collaboration channels, initiating, by one or more processors, a different social collaboration channel for the set of subject matter experts;

determining, by one or more processors, that a consensus to a solution to the at least one problem update is gained by the set of subject matter experts who are relevant to the initial problem definition; and updating, by one or more processors, the at least one problem update to include the solution.

2. The method of claim 1, wherein the initial problem definition is selected from the group consisting of a business impact of a problem and electronic social collaboration channels being launched to resolve the problem.

3. The method of claim 1, wherein identifying the related social collaboration channels associated with the initial problem definition is based on a unique identifier assigned to at least one element selected from the group consisting of an overall incident, the initial problem definition, and the social collaboration channel associated with the initial problem definition.

4. The method of claim 1, wherein the related social collaboration channels are selected from a group consisting of a conference calling bridge, an electronic chat session, and an incident management system.

5. The method of claim 1, wherein determining that the consensus to the solution to the at least one problem update is gained by the set of subject matter experts who are relevant to the at least one problem update is based on a problem statement receiving a greatest number of votes during a poll, wherein the poll is about the at least one problem update and is administered to the set of subject matter experts.

6. The method of claim 1, wherein determining that a consensus to a solution to the at least one problem update is gained by the set of subject matter experts who are relevant to the at least one problem update is based on a refined problem statement agreed upon by the set of subject matter experts.

7. The method of claim 1, further comprising:
responsive to determining that there is more than one problem, resolving, by one or more processors, a conflict using at least one rule, wherein the rule is based on giving precedence to a selection from the group consisting of one related social collaboration channel over another related social collaboration channel, subject matter expert expertise, and geographic locations.

8. A computer program product for providing a dynamic definition of a problem statement during an IT critical situation with an associated conflict resolution, the computer program product comprising:
one or more computer readable storage media and program instructions stored on the one or more computer readable storage media, the program instructions comprising:
program instructions to receive an initial problem definition, wherein the initial problem definition includes a problem with an information technology (IT) component;
program instructions to identify related social collaboration channels associated with the initial problem definition, wherein the related social collaboration channels comprise electronic social collaboration channels;
program instructions to notify users within the related social collaboration channels of the initial problem definition;
program instructions to determine that there is at least one problem update from the related social collaboration channels;
program instructions to identify a set of subject matter experts who are relevant to the at least one problem update;
program instructions to, responsive to determining that there is at least one problem update from the related social collaboration channels, initiate a different social collaboration channel for the set of subject matter experts;
program instructions to determine that a consensus to a solution to the at least one problem update is gained by the set of subject matter experts who are relevant to the initial problem definition; and
program instructions to update the at least one problem update to include the solution.

9. The computer program product of claim 8, wherein the initial problem definition is selected from the group consisting of a business impact of a problem and electronic social collaboration channels being launched to resolve the problem.

10. The computer program product of claim 8, wherein identifying the related social collaboration channels associated with the initial problem definition is based on a unique identifier assigned to at least one element selected from the group consisting of an overall incident, the initial problem definition, and the social collaboration channel associated with the initial problem definition.

11. The computer program product of claim 8, wherein the related social collaboration channels are selected from a group consisting of a conference calling bridge, an electronic chat session, and an incident management system.

12. The computer program product of claim 8, wherein program instructions to determine that the consensus to the solution to the at least one problem update is gained by the set of subject matter experts who are relevant to the at least one problem update is based on a problem statement receiving a greatest number of votes during a poll, wherein the poll is about the at least one problem update and is administered to the set of subject matter experts.

13. The computer program product of claim 8, wherein program instructions to determine that a consensus to a solution to the at least one problem update is gained by the set of subject matter experts who are relevant to the at least one problem update is based on a refined problem statement agreed upon by the set of subject matter experts.

14. The computer program product of claim 8, further comprising:
responsive to determining that there is more than one problem, program instructions, stored on the one or more computer readable storage media, to resolve a conflict using at least one rule, wherein the rule is based on giving precedence to a selection from the group consisting of one related social collaboration channel over another related social collaboration channel, subject matter expert expertise, and geographic locations.

15. A computer system for providing a dynamic definition of a problem statement during an IT critical situation with an associated conflict resolution, the computer program product comprising:
one or more computer processors, one or more computer readable storage media, and program instructions stored on the computer readable storage media for execution by at least one of the one or more processors, the program instructions comprising:
program instructions to receive an initial problem definition, wherein the initial problem definition includes a problem with an information technology (IT) component;
program instructions to identify related social collaboration channels associated with the initial problem definition, wherein the related social collaboration channels comprise electronic social collaboration channels;

program instructions to notify users within the related social collaboration channels of the initial problem definition;

program instructions to determine that there is at least one problem update from the related social collaboration channels;

program instructions to identify a set of subject matter experts who are relevant to the at least one problem update;

program instructions to, responsive to determining that there is at least one problem update from the related social collaboration channels, initiate a different social collaboration channel for the set of subject matter experts;

program instructions to determine that a consensus to a solution to the at least one problem update is gained by the set of subject matter experts who are relevant to the initial problem definition; and program instructions to update the at least one problem update to include the solution.

16. The computer system of claim 15, wherein the initial problem definition is selected from the group consisting of a business impact of a problem and electronic social collaboration channels being launched to resolve the problem.

17. The computer system of claim 15, wherein identifying the related social collaboration channels associated with the initial problem definition is based on a unique identifier assigned to at least one element selected from the group consisting of an overall incident, the initial problem definition, and the social collaboration channel associated with the initial problem definition.

18. The computer system of claim 15, wherein the related social collaboration channels are selected from a group consisting of a conference calling bridge, an electronic chat session, and an incident management system.

19. The method of claim 1, wherein identifying the set of subject matter experts who are relevant to the initial problem definition comprises:

comparing, by one or more processors, a keyword associated with the initial problem definition to skills and availability of a plurality of subject matter experts, wherein the set of subject matter experts comprises at least a subset of the plurality of subject matter experts.

20. The method of claim 1, wherein:

The set of subject matter experts are located in at least two different locations;

The related social collaboration channel and the different social collaboration channel are different types of social collaboration channel.

\* \* \* \* \*